Feb. 9, 1960 W. E. CONLEY ET AL 2,924,272
METHOD OF AND APPARATUS FOR DEHYDRATING MATERIAL
Filed May 6, 1955 2 Sheets-Sheet 2
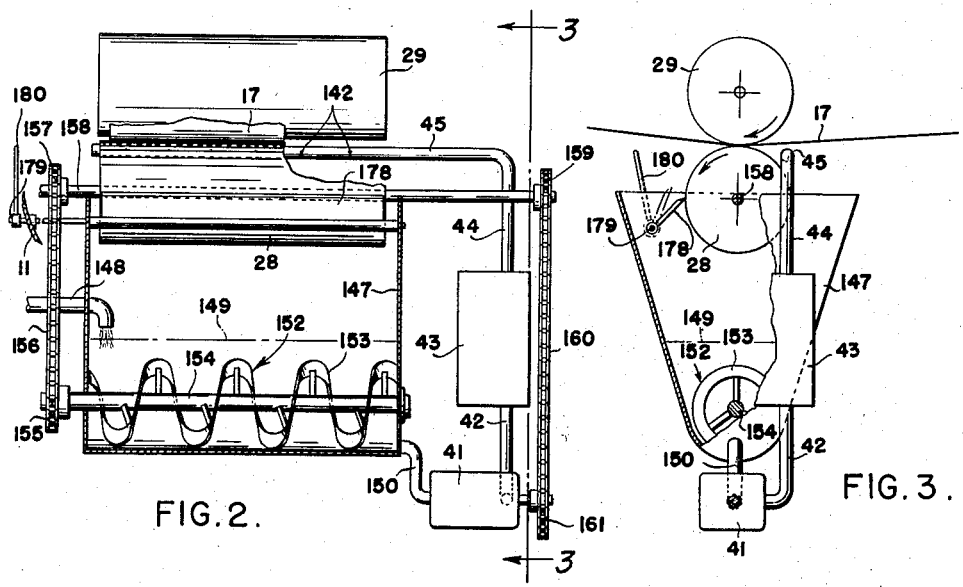
FIG. 2.
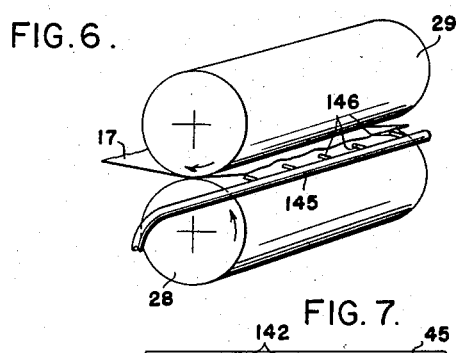
FIG. 3.
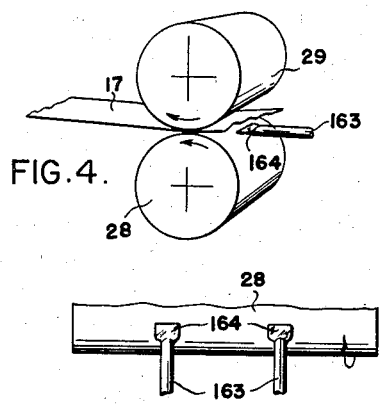
FIG. 4.
FIG. 5.
FIG. 6.
FIG. 7.
FIG. 8.
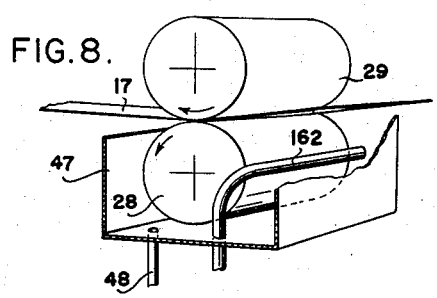
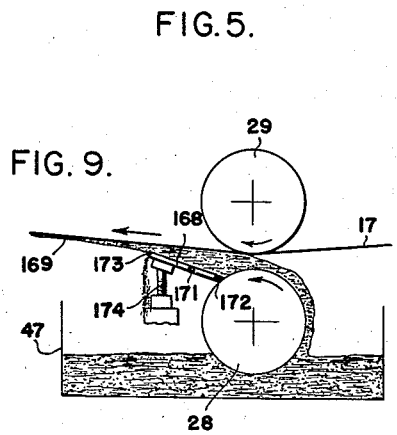
FIG. 9.
INVENTORS
WELD E. CONLEY
FRED FIXARI
BY
W. D. O'Connor
ATTORNEY United States Patent Office 2,924,272
Patented Feb. 9, 1960

2,924,272

METHOD OF AND APPARATUS FOR DEHYDRATING MATERIAL

Weld E. Conley, Wauwatosa, and Fred Fixari, Milwaukee, Wis., assignors to Chain Belt Company, Milwaukee, Wis., a corporation of Wisconsin Application May 6, 1955, Serial No. 506,582

15 Claims. (Cl. 159—12)

This invention relates generally to the art of dehydrating materials and more particularly to an improved method of and improved apparatus for drying materials from a liquid state to the form of discrete flaky particles.

In the drying of wet materials through the use of dehydrating apparatus of the drum and belt type, the material carrying belt is alternately heated and cooled as it runs over heat transferring drums in its circuit of operation within the dehydrating apparatus. For best results in the drying operation it has been found that it is important to maintain individual segments of the belt in the various zones of operation at different precisely predetermined temperature levels. Thus, the segment moving through the feeding zone should be at a predetermined low temperature to receive the wet material that is fed onto it, then as the belt advances it is heated to higher temperatures by graduated increments while the drying proceeds in accordance with a predetermined temperature profile and finally the belt is cooled to a predetermined low temperature to prepare the dried material for removal from the belt as discrete dry particles and to prepare the material receiving segment of the belt for receiving the film of wet material. Although the desired temperature of the belt at various positions in its circuit of operation may be established through proper adjustment of corresponding separately controlled elements of the heating and cooling apparatus at any particular time, changes in the quality of the material being dried or in various other operating conditions soon cause variations from the established predetermined belt temperatures. Consequently, in order that the apparatus may continue operating as intended, frequent observations of the belt temperature have been required heretofore so that the necessary corrections might be made from time to time through readjustment of the control mechanism.

It is a general object of the present invention to improve the art of dehydrating material in a vacuum dehydrator of the drum and belt type.

Another object of the invention is to provide an improved system for operating a vacuum dehydrator of the drum and belt type.

Another object is to provide for controlling automatically the temperatures of different segments of a dehydrating belt in the various positions it assumes in its circuit of operation.

Another object is to provide improved control mechanism for a dehydrator of the belt type that is arranged to operate automatically in response to changes in the temperature of the belt at various stations in its circuit of operation.

Another object is to provide a new method of dehydrating material from a liquid state to form discrete flaky particles.

Another object is to provide an improved arrangement for controlling the temperature of a steam heated drying drum.

Another object is to provide an improved arrangement for cooling and for controlling the temperature of a cooling drum.

Another object is to provide for cooling the belt of a belt type dehydrator to condition it for receiving wet material to be dried.

Another object is to provide for improving the transfer of heat between a drying belt and a supporting heat exchanging drum in a vacuum dehydrator.

Another object is to provide improved apparatus for feeding liquid material being dried onto a moving drying surface in the form of a thin film.

A further object is to provide an improved doctor blade for scraping the material carrying surfaces in a dehydrator.

According to the present invention, a vacuum dehydrator of the belt and drum type in which an alternately heated and cooled belt carries material to be dried through a dehydrating cycle, is provided with temperature sensing devices arranged to respond to the temperature of segments of the belt passing critical positions in the apparatus. The various temperature sensing devices are connected through appropriate control apparatus to control the heating and cooling system that determines the belt temperature. Accordingly, the apparatus may operate automatically in response to any change in the belt temperature at any sensing station to effect immediate correction of the temperature of the corresponding belt segment to the selected predetermined level. For example, the temperature of the belt at the feeding position is maintained at the level best adapted to receive and precondition the wet material for drying. To facilitate changing the belt temperature and to improve the control action, special provision is made for improving the conditions of heat transfer between the belt and a heat exchanging drum while operating under a vacuum. Furthermore, improved arrangements are provided for feeding wet material being dried onto the drying belt and an improved doctor blade is provided for cleaning the surface of the feeding roller and for removing the dried material from the belt.

The foregoing and other objects of this invention will become more fully apparent, as the following detailed description of an improved vacuum dehydrator of the drum and belt type constituting exemplary embodying apparatus is read in conjunction with the accompanying illustrative drawings wherein:

Fig. 2 is an enlarged schematic diagram showing an improved material feeding apparatus taken transversely of the drying belt and constituting a modification of the feeding apparatus shown in Fig. 1;

Fig. 3 is another schematic diagram of the modified feeding apparatus shown in Fig. 2, taken generally on the longitudinal vertical plane represented by the line 3—3 in Fig. 2;

Fig. 4 is a fragmentary diagrammatic view in perspective showing another improved feeding apparatus with part of the cooperating drying belt.

Fig. 5 is a fragmentary diagrammatic plan view showing a variation of the feeding apparatus illustrated in Fig. 4;

Fig. 6 is another diagrammatic view in perspective illustrating a variation of the feeding apparatus shown in Figs. 2 and 3;

Fig. 7 is a detailed view showing a modified feeding pipe for the feeding apparatus of Figs. 2 and 3;

Fig. 8 is another diagrammatic view in perspective illustrating a variation of the feeding apparatus shown in Figs. 2, 3 and 6; and, Fig. 9 is a diagrammatic view in elevation of still another form of feeding mechanism for applying wet material to be dried to the drying belt.

Figure 1:
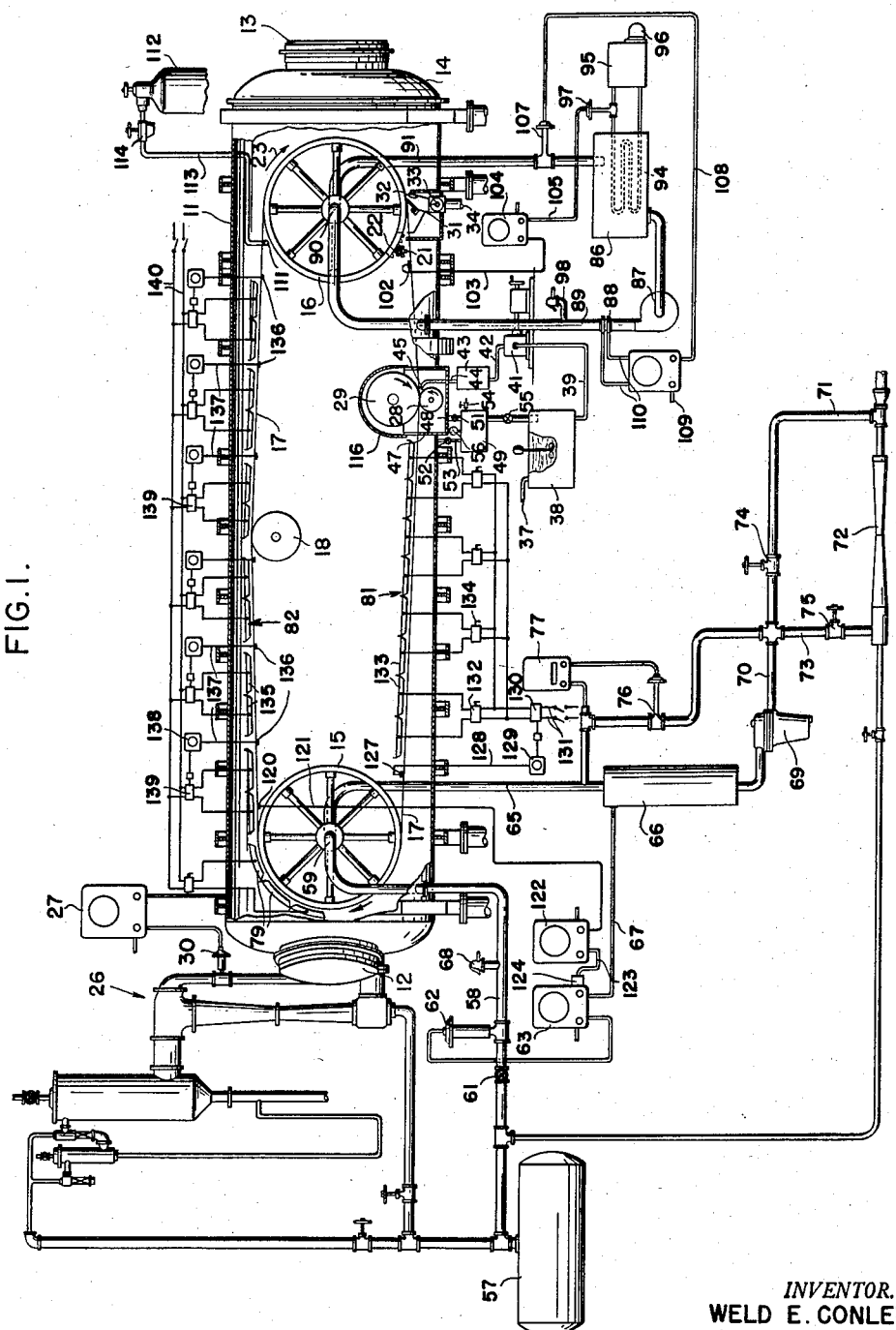
Figure 1 is a schematic diagram representing an improved vacuum dehydrator of the drum and belt type embodying the present invention, the front side of the housing having been broken away in vertical longitudinal section to show the interior mechanism and its associated control apparatus.

Referring more specifically to the drawing and particularly to the schematic diagram shown in Figure 1, the improved dehydrator there illustrated in outline is of the type employing a drying conveyer including a material carrying belt operating over a pair of spaced drums in a vacuum chamber. The dehydrator comprises in general a large cylindrical housing 11 that is closed at its ends to form an air tight vacuum chamber, the ends being provided respectively with manholes 12 and 13 for access to the operating mechanism within the chamber. The closure at the right end of the chamber, as shown in the drawing, is in the form of a separate dome or end-bell 14 that is removable for the purpose of introducing the operating mechanism into the chamber.

The double drum and belt type drying conveyer within the chamber is in the form of a unitary independent apparatus including a frame (not shown) that carries at the left end a large rotatably mounted heating drum 15 and at the right end a cooling drum 16 of similar size, together with an endless material carrying belt 17 that is alternately heated and cooled as it operates over the two drums to constitute a drying conveyer. In this instance the drums 15 and 16 may be nearly eight feet in diameter and are shown as being of the same size although in other embodiments the two drums may differ in size and be either larger or smaller than here shown depending upon the circumstances of operation. The two drums are shown as being spaced apart a distance of about thirty five feet, center to center and the upper run of the belt 17 may be supported as desired in the region of its midportion by means such as an idler roller 18.

The belt 17 is preferably a continuous band of relatively thin flexible metal such as stainless steel that is in this case about four feet wide and is maintained under suitable tension by means of tensioning apparatus (not shown) carried by the drum supporting frame. The cooling drum 16 presents a metallic peripheral belt receiving surface and is driven at a selected speed by means of suitable variable speed power driven mechanism (not shown) connected to turn a pair of pinions 21 that mesh with complementary ring gears 22 on the respective ends of the cooling drum 16. The dehydrator drying belt 17 operates around the drums 15 and 16 in the direction indicated by the arrow 23 and its speed of movement may range from about fifteen feet a minute to one hundred feet a minute, although under special circumstances the belt speed may be increased to several hundred feet a minute. Mechanical details of belt tensioning and aligning mechanism and of variable speed driving mechanism suitable for a dehydrator of this type are shown and described in copending applications, Serial No. 364,458, filed June 27, 1953 and Serial No. 564,996, filed February 13, 1956, directed to continuous vacuum dehydrators generally similar in operation to the apparatus represented diagrammatically in Figure 1.

The required vacuum or reduced pressure atmosphere for dehydrating wet material is maintained within the chamber 11 by means of a vacuum producing ejector system comprising a multiple stage steam jet ejector or vacuum pump 26 that is connected to the left end of the housing 11. The vacuum pump 26 has associated with it an adjustable automatic recorder-controller or regulator 27 that is responsive to the pressure conditions within the chamber 11 and that operates a recirculating valve 30 to recirculate vapors in a manner to establish and maintain the desired degree of vacuum therein within the limits of the capacity of the vacuum pump 26.

The material to be dried is applied in liquid form to the lower run of the belt 17 on its outer or lower surface by means of a rotatably mounted cooperating applicator or feeding roller 28. As shown in the drawing, the roller 28 rolls the wet material onto the surface of the belt shortly after the belt leaves the cooling drum 16 and at some distance from the heating drum 15. To maintain the belt 17 flat and accurately in precise position to receive the wet material from the feeding roller 28 in the form of a film of predetermined thickness, there is provided a back-up roller 29 that is rotatably mounted to engage the upper or inner surface of the belt run at a position opposite from the feeding roller 28 for stabilizing the belt in predetermined spaced relationship with the feeding roller.

In a typical drying operation, the film of wet material applied to the belt by the feeding roller 28 is carried by the belt around the heating drum 15 whereupon most of the water in it is driven off as vapor by the heat of vaporization supplied by the heating drum 15, into the low pressure atmosphere within the vacuum chamber 11. After the material has been dried, the belt 17 carries it around the cooling drum 16 where it is cooled rapidly to preserve its quality and to prepare it for removal from the belt. For removing the dried product, a doctor blade 31 is provided at the lower side of the cooling drum 16 to engage and scrape the dried material from the outer surface of the belt as the belt is about to recede from the cooling drum. The particles of dried product thus removed by the doctor blade 31 fall into a collecting trough 32, that is provided with a rotating screw conveyer 33 which operates to convey the material into a suitable product receiving chute 34.

The liquid material to be dried may be in the form of an extract or juice concentrate that is delivered through a pipe 37 into a storage reservoir 38 from which it is withdrawn through a pipe 39 by means of a positive metering pump 41. The pump 41 forces the material at a predetermined rate through a pipe 42 and a heat exchanger 43 into a pipe 44 leading to a perforated feeder pipe 45 that delivers it to the periphery of the feeding roller 28 at spaced positions along its length. As more fully explained and claimed in the previously mentioned copending application, Serial No. 364,458, the feeding roller 28 is rotated by power at a selected predetermined speed and is adjustably positioned in accurate cooperating relationship with the belt 17 in a manner to apply to the belt a film of material of the required thickness and other characteristics. A suitable feeder pan or drip pan 47 is provided beneath the feeding roller 28 to provide for partly submerging the feeding roller if desired and for the purpose of collecting any of the wet material that may drip from the roller or from the belt during the feeding operation. Material thus collected in the drip pan 47 may drain away through a pipe 48 into a salvage tank 49.

The salvage tank 49 may be drained periodically as required by first closing a valve 51 in the drain pipe 48 and a valve 52 in a vacuum line 53 communicating between the tank 49 and the chamber 11. Air may then be admitted into the tank 49 by opening a bleeder valve 54 to break the vacuum. A drain valve 55 at the bottom of the tank 49 may then be opened to drain the collected material back into the reservoir 38 where it commingles with the wet material being pumped to the feed roller 28. After the salvage tank 49 has been drained, the drain valve 55 and the bleeder valve 54 are closed and the vacuum reestablished in the tank 49 by gradually opening the valve 52 in the vacuum line 53, the degree of vacuum being indicated by a vacuum gauge 56 connected to the tank 49. With the tank 49 again evacuated, the drain pipe valve 51 may be reopened to provide a continuously operating drain for the drip pan 47.

The heating drum 15 which supplies the major portion of the heat of vaporization to the film of material being dried, is preferably heated by steam for reasons of convenience and economy and may be of the type shown in detail in the previously mentioned copending application, Serial No. 364,458. The heating steam may be drawn from any suitable source such as a boiler 57 which also supplies steam to the ejector 26, the heating steam flowing through a pipe 58 to a rotary coupling 59 that admits it to one end of the heating drum 15. A shut off valve 61 in the pipe 58 may be opened to admit the steam to the drum and a steam controlling valve 62, also in the pipe 58, serves to control the rate of flow of steam into the drum 15. As shown, the steam controlling valve 62 is connected to be actuated by a pressure responsive controller 63 which may be set to maintain the steam pressure and therefore the temperature of the heating drum 15 at a predetermined level.

Water accumulating within the heating drum 15 as the steam condenses is discharged at the other end of the drum through another rotary coupling (not seen) into a condensate or exhaust pipe 65 that extends downward out of the chamber 11 to a receiver tank 66 which serves to separate the water from steam carried with it. The pressure of the steam in the receiver tank 66 is communicated through a pipe 67 to the pressure responsive instrument 63 to effect control of the incoming steam in accordance with the pressure of the fluid leaving the drum through the exhaust system. A pressure relief valve 68 is connected with the steam pipe 58 to relieve any excess pressure that may occur in the drum 15 through inadvertent operation of the controls. From the receiver tank 66 the condensate passes through a steam trap 69 that prevents the escape of steam but permits the water to flow out through a discharge pipe 70 into a suitable drain 71.

In order that the heating drum 15 may be operated at temperatures lower than that corresponding to the temperature of the heating steam at atmospheric pressure, there has been provided a steam jet vacuum pump 72 that is connected by a vacuum pipe 73 to both the discharge pipe 70 and the exhaust or condensate pipe 65 and that discharges into the drain 71. By closing a shut-off valve 74 to prevent direct communication between the discharge pipe 70 and the drain 71 and by opening a shut off valve 75 to connect the vacuum pipe 73 to the steam jet vacuum pump 72, the pump becomes effective to reduce the steam pressure existing in the drum 15 below atmospheric pressure thereby reducing the temperature of the heating drum proportionately, the steam pressure controller 63 being set at the appropriate value to admit steam as required to maintain the subatmospheric pressure. A control valve 76 in the vacuum pipe 73 has associated with it a temperature responsive instrument 77 that is connected to sense the temperature of the fluid in the vacuum pipe 73 and to regulate the valve 76 in a manner to open it whenever the fluid temperature becomes too low.

Ordinarily the instrument 77 is set to respond to a temperature two or three degrees lower than the steam temperature corresponding to the pressure setting of the steam pressure regulating instrument 63. Thus if the temperature of the exhaust fluid in the condensate pipe 65 drops below normal because of the presence of air for example, the instrument 77 will respond by opening the valve 76 thereby permitting the vacuum pump 72 to remove the air and to promote the circulation of steam until the steam temperature is restored. In the meantime the vacuum pump 72 serves to withdraw condensate water from the steam trap 69 through the drain pipe 70 at subatmospheric pressure and to discharge it into the drain 71. With this arrangement, the temperature of the heating drum 15 may range from about 140 degrees to about 295 degrees Fahrenheit, but ordinarily it is operated in the range between 210 degrees F. and 240 degrees F. By heating the drum 15 in this manner with steam supplied at a predetermined uniform pressure and temperature, the major drying action on the material as the belt moves around the drum 15 may be effected at the optimum temperature with best economy and under precise control.

As more fully explained in copending application Serial No. 490,972, filed February 28, 1955, the temperature of the drum 15 is maintained as high as possible without overheating or scorching the material being dried in order that the drying action may be effected most expeditiously and therefore with least detrimental effect upon the material being dried. To assist the drying action of the drum, an auxiliary radiant heater 79 is fitted about the upper left quadrant of the drum in a position to heat the material farthest from the belt. This rapid heating action increases the overall efficiency of the drying operation and by limiting the time during which the material is subjected to the heat of the drum, reduces the likelihood of injuriously affecting the material by excessive heating. However, with the drum 15 operating at the optimum high temperature for best efficiency it is so hot that should freshly applied wet material be carried onto it by the belt 17 the material would boil and spatter from the belt because of the rapid initial evaporation of its moisture. This difficulty has been overcome as more fully set forth in the copending application, by preconditioning the wet material on the belt before it arrives at the heating drum through operation of a bank of radiant heaters 81 that constitute a preheater to heat the inside of the belt from above and gradually evaporate some of the moisture from the film of material on its lower surface as it approaches the heating drum.

As the belt passes around the drum 15 the moisture is evaporated rapidly from the preconditioned film of material but because of the low pressure vacuum condition existing within the chamber 11 the heat from the drum does not appear as sensible heat and the temperature of the material does not rise appreciably but remains substantially at the temperature of vaporization of moisture at the pressure in the chamber. However, as the material becomes dry it loses this protective effect of evaporation and tends to become overheated if exposed to the high temperature of the drum 15 too long. To avoid damage to the material by overheating, the belt is accordingly operated at a suitable speed to withdraw the material from the influence of the drum before it becomes too hot. Although the material is almost dry when the belt carries it from the drum, in order to dry it still further another bank of radiant heaters 82 is arranged to constitute an afterheater that directs radiant heat onto the top of the film of material on the run of the belt receding from the heating drum 15. The afterheater 82 serves to heat the material progressively and as explained in the copending application Serial No. 490,972 to complete the drying action without injuriously overheating the dried product. Furthermore, when drying thermoplastic materials, the afterheater 82 may be operated in a manner to effect limited melting of the film of the nearly dry material on the belt to control the density of the dried product and to condition it for removal from the belt by the doctor blade 31.

The cooling drum 16 may be of the type shown in the previously mentioned copending application Serial No. 364,458 or of any other suitable type adapted to be cooled by circulation of a cooling fluid through it. As shown, in this instance a suitable cooling fluid is circulated from a receiver or storage tank 86 by means of a circulating pump 87 which forces it through a flow rate sensing element 88 in a pipe 89 that is connected by a rotary coupling 90 to one end of the cooling drum 16. Another similar rotary coupling (not seen) connects the other end of the cooling drum to a discharge pipe 91 that constitutes a return conduit leading back to the storage tank 86. The cooling liquid in the storage tank 86 is cooled by means of submerged coils 94 that are operatively connected with a refrigerating mechanism 95 driven by a suitable motor 96. The refrigerating mechanism 95 has associated with it a control valve 97 that serves to control the cooling action of the submerged coils 94, and, therefore, operates to regulate the temperature of the cooling liquid and of the drum 16. A pressure relief valve 98 is connected with the cooling fluid pipe 89 to relieve any excess pressure that might occur within the cooling drum 16 through inadvertent operation. By this arrangement the temperature of the drum 16 may be reduced to any desired value, ordinarily in the range between 30° and minus 15° F., or lower if desired.

As mentioned in the previously recited copending applications, it has been found that it is important to maintain the temperature of the belt as it recedes from the cooling drum at a predetermined level best adapted to receive the thin film of wet material applied by the feeding roller 28. This is accomplished by regulating the temperature of the cooling drum 16. However, the temperature of the belt at the feed roller is influenced by other factors in addition to the temperature of the cooling drum. That is to say, the belt temperature varies for instance upon varying the speed of the belt since the belt remains in contact with the cooling drum for a different length of time, depending upon the belt speed. Also the temperature of the belt as it runs onto the cooling drum is influenced by action of the heating drum 15 and the afterheater 82 and any change in initial temperature thus established influences the belt temperature as it leaves the cooling drum. Furthermore, the operating pressure within the chamber 11 exerts an influence in that as the pressure is reduced it becomes more difficult to transmit heat from the belt to the drum because of the vacuum in the space ordinarily occupied by a film of heat transferring fluid between them.

In accordance with a feature of the present invention, the difficulty encountered in maintaining the belt temperature constant is overcome by means of automatic temperature control apparatus. For this purpose there is provided a temperature sensing device 102 positioned to cooperate with the inner surface of the belt 17 as it recedes from the cooling drum 16. The temperature sensing device 102 may be of any suitable type and may take the form of a thermocouple carried by a shoe having sliding engagement with the belt surface. The temperature sensing device 102 is connected to means for controlling the temperature of the cooling drum 16. As shown, the temperature sensing device 102 is connected by an electrical circuit or lead 103 to a manually adjusted temperature responsive control instrument 104 which is in turn operatively connected by a pressure conduit 105 to control the temperature regulating valve 97 associated with the refrigerating machine 95. By this arrangement any variation in the temperature of the belt 17 as it recedes from the cooling drum 16 that may occur through changing operating conditions or for other reasons, is immediately detected by the device 102 which operates through the adjustable control instrument 104 and the valve 97 to change the temperature of the coolant being circulated through the cooling drum 16 thereby correcting the temperature of the belt to the predetermined value. Through manually adjusting the controlling instrument 104, the temperature at which the belt is maintained may be raised or lowered as required to adapt it to the characteristics of the material being dried. For example, changes in the belt temperature can result in changing the thickness and density of the film of wet material applied to the belt and likewise in changing the density and other characteristics of the dried product as it is removed from the belt by the doctor blade 31.

A flow control valve 107 in the coolant circulating discharge pipe 91 is connected by a conduit 108 to be regulated by means of a flow control regulating instrument 109 that is responsive to the flow rate sensing element 88 in the coolant pipe 89 to which it is connected by conduits 110. By this arrangement the temperature of the cooling drum 16 may be regulated through varying the rate of flow of the coolant liquid. Furthermore, as explained in copending application Serial No. 364,458, the cooling drum 16 is so constructed that the coolant is admitted at its midportion and is discharged at its ends whereby a difference in temperature may be established between the midportion and the ends of the drum and likewise between the center strip and the edges of the belt 17. This variation of temperature across the width of the belt can be regulated through regulation of the rate of coolant flow by adjusting the control valve 107 as explained. These temperature differences can be utilized for example to cause the film of material applied to the belt to be heavier along the center strip of the belt than along the edges or vice versa either of which variation may be desirable under some circumstances.

To compensate for the insulating effect of the vacuum condition existing between the belt and the drum, means have been provided to introduce a fluid between the belt and the drum as the belt runs onto the drum in order to form a film of molecules that serves to conduct heat from the belt to the drum by molecular conduction. For this purpose a perforated feeder pipe 111, generally similar to the liquid material feeder pipe 45, is arranged parallel with the axis of the drum 16 in the generally triangular space between the belt and the drum periphery, the pipe being provided with a series of spaced perforations through which a heat conducting fluid may be introduced between the drum and the belt.

The heat conducting fluid may be air or water or it may take the form of a heavy gas such as carbon dioxide or of a high vapor pressure liquid such as one of the silicones or propylene glycol or any other suitable fluid material. The fluid is supplied to the perforated feed pipe 111 from a supply tank 112 through a pipe 113 under the control of a valve 114. The film of fluid thus introduced between the belt and the drum serves to fill the voids therebetween in a manner to facilitate the molecular conduction of heat from the belt to the drum for more effective cooling of the belt. A similar effect may be obtained by operating the apparatus with the chamber at such a pressure and the cooling drum 16 at such a temperature that water vapor within the chamber 11 will condense upon the exposed periphery of the cooling drum 16 either in the form of moisture or as frost which immediately melts under pressure of the belt to provide a heat conducting liquid film between the belt and the drum. As a further aid to heat transfer, the contacting surfaces of the belt and the drums may be treated to facilitate radiation and absorption of heat by coloring them black, for example.

As explained in the previously mentioned copending applications, both the feeding roller 28 and the backing roller 29 may be arranged to receive circulating cooling fluid to cool them. These rollers may be connected to receive the coolant fluid directly from the coolant circulating pump 87 in order that they may be operated at the same temperature as the cooling drum 16, or on the other hand they may be connected with independent coolant circulating systems for operation at different temperatures. To prevent unintentional heating of the backing roller 29 by heat radiated from the preheater 81 and the afterheater 82, the backing roller is protected by means of a suitable semicylindrical shield 116 that may be in the form of a curved sheet of stainless steel or other suitable shielding material.

The temperature of the belt 17 as it leaves the heating drum 15 may be regulated automatically in a manner similar to that in which the temperature of the run of the belt leaving the cooling drum is regulated as previously described. For this purpose there is provided a temperature sensing device 120 that is disposed to cooperate with the inner surface of the belt 17 as it recedes from the heating drum 15. The temperature sensing device 120 is connected by an electrical conductor 121 to a temperature responsive instrument 122 that is connected by means of a conduit 123 to an actuator 124 that operates to change the pressure setting of the pressure regulating instrument 63. By this arrangement the pressure of the incoming steam and hence the drum temperature may be regulated by the valve 62 as previously explained under control of the pressure responsive instrument 63 either by adjusting the instrument 63 manually or through automatic operation under the control of the temperature responsive instrument 122 that is actuated in response to the temperature of the belt as it leaves the heating drum as sensed by the temperature responsive device 120.

Furthermore, in a generally similar manner the operation of the preheater 81 may be regulated in response to the temperature of the belt as it is about to run onto the heating drum 15. For this purpose there is provided a temperature responsive sensing device 127 that is disposed to cooperate with the inner surface of the lower run of the belt 17 just prior to its engagement with the heating drum 15. The temperature sensing device 127 is connected by an electrical conductor 128 to a control instrument 129 that operates a control unit 130 in an electrical supply circuit 131 that leads to individual control units 132 for the several pairs of radiant heating units 133 which make up the preheater 81. As shown, the control units 132 are each separately adjustable by manually operated control knobs 134. Through use of this automatic control arrangement the amount of radiant heat furnished by the preheater 81 may be increased or decreased as required to compensate automatically for any changes which may occur in the characteristics of the film of material applied to the belt surface by the feeding roller 28. Thus, the temperature of the belt as it approaches the heating drum 15 is maintained constant and likewise the heating effect upon the film of material carried by the belt remains uniform regardless, for example, of more or less moisture in the material from time to time as it is applied to the belt. At the same time, the heat gradient established in the belt by the preheater 81 may be adjusted as desired by actuating the manually operated control knobs 134 on the individual control units 132.

In a generally similar manner the afterheater 82 may likewise be controlled automatically in accordance with the temperature of the belt in order that the drying action in this zone may be as effective as possible without danger of overheating the dried material. However, in this instance instead of relying upon a single belt temperature sensitive device, each pair of radiant heating elements 135 constituting a heating unit is provided with a temperature sensing device 136 that cooperates with the inner surface of the belt as it moves out from under the corresponding heating unit. As shown, each temperature sensing device 136 is connected by a lead 137 to a manually adjustable temperature responsive instrument 138 that actuates a controller 139 operating to regulate the flow of electrical energy from a supply line 140 to each set of heating elements 135. Through adjusting each of the several instruments 138, the temperature of the segment of the belt 17 under each set of heating elements 135 may be regulated and then is maintained automatically at the level best adapted to effect the required drying action on the material carried by the belt at the position sensed by the corresponding sensing device 136 without overheating the nearly dry material.

Each of the several temperature sensing devices may be of the same type, and they may either depend upon sensing heat radiated from the belt or they may be of the contact type, for example, in the form of thermocouples secured to metallic shoes which have direct sliding engagement with the inner surface of the belt, as previously mentioned. The sliding shoes each may be in the form of a strip of phosphorus bronze to which the thermocouple is soldered, suitable insulation being provided to prevent the escape of heat and to isolate them electrically. The phosphorus bronze shoes operate with so little friction that changes in belt speed do not materially affect the temperature indication since very little heat is developed by friction between the shoes and the belt. Consequently, they sense changes in temperature with sufficient accuracy to maintain the belt temperature constant through operation of the automatic control system herein described.

From the foregoing explanation of the functioning of the automatic control mechanism operating in response to temperature changes as sensed by the temperature sensing devices, it may be seen that the various critical conditions required for the successful drying of any particular material may be established readily and maintained automatically for a continuous process in accordance with a predetermined method of operation.

In considering various substances that may be dried under automatic control in accordance with the improved arrangement herein set forth, coffee concentrate may be taken as a specific example of materials that are well adapted to drying in this manner. In the drying of coffee concentrate, it is important that the density of the dry product be maintained approximately constant in order that a predetermined amount of the product by weight may be packed in a container of given dimensions without too much deviation from a predetermined degree of filling the container. That is, a given weight of the dry particles of coffee should fill the container to the desired level consistently. Thus, if the material is not dense enough it will overflow the container, while on the other hand, if it is too dense the container will be only partially filled even though the proper amount of material by weight is present. Accordingly, it is important that the dehydrator be operated in a manner to maintain the material at a predetermined degree of density while at the same time obtaining the maximum amount of production. In the drying of coffee concentrate, it has been found that the density of the product is dependent, among other factors, upon the temperature of the belt as it leaves the cooling drum. Hence, for material of a predetermined degree of concentration, the degree of density can be regulated by adjusting the temperature of the belt at the position at which the material is fed onto the belt surface. At the same time the rate of production is dependent primarily on the thickness of the film of material applied to the belt since the more material that is applied the more product will be collected when the dried material is scraped from the belt. It has also been found that the temperature of the belt has an influence on the thickness of the layer being applied to it. Thus as the temperature of the belt is reduced the layer of wet material becomes heavier and more viscous. By the same token there is less heat in the belt to cause the wet material to expand for drying or to boil and spatter from the belt. Accordingly, in operating the apparatus, the belt temperature and other factors require adjustment from time to time to bring about the production of a dried product of the desired density, the temperature of the belt being reduced to increase the density of the product or vice versa. Once the desired product density has been achieved, the speed of the belt, the heat gradient and other factors may be adjusted gradually to effect an increase in the rate of production, the various adjustments being made in a manner to avoid change of the density of the product. Thus the feed roll clearance may be increased, which tends to increase the thickness of the material film and at the same time tends to increase the product density. Also the speed of the belt may be changed and the amount of heat supplied by the afterheater adjusted to maintain the balance between the rate of production, the degree of dryness and the density of the product.

In applying the heat to the material on the belt it is necessary that the material be caused to puff and that the puffing be maintained as the material is carried around the heated drum by the belt. The afterheater is adjusted to complete the drying action through supplementing the action of the heating drum to dry the product to the required degree of dryness at the higher production rate. The amount of heat that may be supplied by the afterheater is limited to the amount that the material will stand without heat damage to the nearly dried particles. In the case of coffee, the heat damage may occur through burning or charring the outer surface of the outer material, without changing its structure since the puffed coffee film is not subject to melting and therefore, the afterheater has little effect upon the thickness of the puffed layer or upon the density of the final product.

Another material that is adapted to be dried in the dehydrator is orange juice concentrate. This material is quite difficult to dry successfully largely because of its high sugar content and other characteristics that make the partially dried material sticky and difficult to handle as well as subject to scorching if overheated. The orange juice to be dried is concentrated to at least about 50% solids, it being preferable to reduce the moisture content to about 35% before the drying operation, although the degree of moisture in the concentrate may range from 52% to 30% or thereabouts.

With the liquid juice concentrated to a moisture content of 35% for example, its freezing point is reduced to well below zero degrees Fahrenheit. Accordingly, the material may be subjected to the drying action of a vacuum condition in the chamber at an absolute pressure in the order of from eight tenths of a millimeter of mercury to one and one-half or two millimeters of mercury without causing an appreciable amount of the liquid in the material to freeze. At this high vacuum, vaporization occurs at a rapid rate, the rate of vaporization being much higher when drying from the liquid state than it would be in drying from the frozen state because the moisture escapes much more readily from the liquid. Furthermore, the fact that the liquid material is presented in the form of a thin film facilitates the drying action since the rate of evaporation from a layer of material generally varies inversely with the square of the thickness of the layer. To this end the clearance between the feeding roller 28 and the belt 17 should be adjusted to about two hundredths of an inch. In applying the orange concentrate to the belt, it is preferable that the belt should be cooled at the point of application of the material to a temperature of about 40° to 80° F. although it may be somewhat higher. To accomplish this temperature reduction the cooling drum should be quite large and it should be cooled to a low temperature preferably in the order of 0° F. depending upon the chamber pressure and other factors. With the liquid material in the form of a thin film on the belt, the drying action is substantially uniform throughout the film.

In drying orange concentrate, the preconditioning of the wet material on the belt is especially important since the material is particularly susceptible to excessive boiling and spattering from the belt when first applied in the wet condition. The liquid orange concentrate is fed to the belt at a temperature of from 0° to 20° F., or thereabouts and since the belt, even though cooled, is warmer than the concentrate, the wet material begins to puff and expand immediately after the belt leaves the feeding roll. This appears to be caused by the action of the relatively warm belt in evaporating moisture together with the effect of the vacuum in expanding the moisture vapor and entrained gases in the thin film of material. This expanding action is assisted by the mechanical action of the feeding roller in pulling away from the sticky coating on the belt and since the film is on the lower surface of the belt, the action of gravity is a contributing factor.

In this connection the temperature of the belt which is determined by the temperature of the cooling drum is rather critical since if the belt temperature is too high the wet material does not adhere well to the belt surface and furthermore will be expanded too rapidly and will drip and spatter from the belt. Through proper adjusting of the belt temperature, the characteristics of the film of material as applied to the belt may be regulated not only to facilitate subsequent steps in the drying action but also to influence to some degree the density and other characteristics of the dried product when finally removed from the belt, as previously explained. Through effecting the initial evaporation of moisture from the thin film of material by the preheater at a moderate rate, localized areas of vaporization are avoided and the predrying operation progresses smoothly and as rapidly as possible. If the heat is applied to the film too rapidly or if the film happens to be too thick, vapor pressure may build up in spots within the material thereby changing its drying characteristics locally and causing it to spatter from the belt or otherwise interfering with the uniformity of the entire drying operation.

Altogether approximately 9% of the total initial moisture is removed from the film of orange concentrate by the gradual progressive action of the preheater 81 thereby reducing the moisture content of the wet material from about 35% to a little less than 32%. While the moisture content is thus being reduced during the preheating operation, the film of wet material is being preconcentrated and preconditioned, the preferred expanded condition being maintained or increased as desired through adjusting the heat to cause continued formation of small bubbles beneath the surface that operate to remove gas from the material and form a puffed mechanical structure of greatly increased volume and surface area. The puffed structure thus formed while gradually drying, is sturdy enough to withstand the rapid evaporation occurring under the higher drying temperature of the heating drum 15 without danger that it will be dislodged from the belt by excessive boiling when it is carried by the belt onto the drum. As the belt passes around the drum, the wet material is dried at the proper rate to avoid excessive boiling or scorching through regulating the drum temperature and the drying pressure or vacuum in the chamber together with other conditions. Likewise the conditions to which the film of material is subjected to cause it to expand to the desired degree for maintaining or increasing the preferred puffed condition.

While under the influence of the heating drum, about 80% of the total initial moisture in the wet material is removed thereby reducing the moisture content from about 32% to about 4%. After the belt carries the material away from the drum the afterheater 82 removes an additional 6% or 7% of the total initial moisture to reduce the final moisture content to approximately 2% or less, it being preferable to dry the resulting orange crystals to less than 1% of moisture. As previously mentioned, the figures given are for a specific material taken as an example and are approximate only, being subject to considerable variation depending upon the composition of the particular orange juice concentrate being dried and other varying conditions.

During final drying under the influence of the afterheater 82, the radiant heat is applied in a manner to maintain the desired degree of puffing in the film of material for rapid drying while effecting the final drying action to the desired moisture content without injuriously overheating the nearly dry material. Furthermore, the afterheater 82 may be operated in a manner to effect limited melting of the outer surface of the plastic film of material in order to partially collapse the puffed film thereby reducing its insulating effect to prepare the material for rapid cooling by the cooling drum 16 when the belt runs over it. Since the run of the belt between the heating drum 15 and the cooling drum 16 is relatively long, the material drying on the belt is exposed to the influence of the afterheater 32 for a considerable period of time which permits the desired degree of final drying to be accomplished gradually without overheating and facilitates the desired puff-reducing melting of the outer surface. This puff collapsing or conditioning of the film of dry material by the afterheater not only facilitates removal of the product from the belt by the doctor blade 31 but also influences the density of the final product in cooperation with the control of other factors. During the drying operation, the belt 17 may be operated at a speed in the neighborhood of fifty feet a minute or higher depending upon the particular circumstances and the temperature of the belt in running over the heating drum 15 should be maintained at about 140° to 190° F. With the temperature of the cooling drum 16 in the order of 0° F., the dried product may be quickly cooled to below its plastic state temperature and rendered friable to facilitate its removal from the belt 17 by the doctor blade 31 in the form of discrete crystalline or flaky particles instantly soluble in water.

The feeding of the wet material to be dried to the lower surface of the drying belt may be accomplished in any one of various different ways. As more fully explained in the previously mentioned copending application Serial No. 364,458, according to one method, the feeding roller 28 dips into a quantity of the wet material that is maintained at a predetermined level in the feed pan 47. Then as the feeding roller 28 is rotated at a predetermined speed, the wet material adheres to its periphery and is carried upward and applied by a rolling action to the lower surface of the belt 17 as it moves over the roller. The speed of rotation of the feeding roller 28 and its spacing from the belt are preferably adjustable to provide for controlling the thickness and other characteristics of the film of material deposited on the belt as explained in the copending application. Ordinarily, the periphery of the roller moves at a speed substantially equal to the speed of movement of the belt 17, although it may be rotated faster for feeding thin material to the belt. The material carrying surface of the feeding roller 28 may be polished or it may be lightly sanded, whichever is best adapted to convey the particular material being dried.

In accordance with another method of applying the wet material to the belt, instead of the roller 28 dipping into the material in the feed pan, the wet material is applied directly to the peripheral surface of the feeding roller 28 in the generally V-shaped space between the feeding roller and the belt by means of the perforated feeder pipe 45 shown in Fig. 1 and previously mentioned. The perforated feeder pipe 45 is shown more in detail in connection with the modified feeding apparatus illustrated in Figs. 2 and 3. As shown in Fig. 2, the perforated feeder pipe 45 is provided with a series of orifices or holes 142 that are arranged in spaced relationship along the side of the pipe presented toward the feeding roller 28 from near one end almost to the other end of the roller in such a manner that streams of material fed through them onto the surface of the roller merge into a continuous body or roll of material as it is carried by the roller into contact with the belt. In this manner the wet material is rolled directly onto the belt and any excess material that may be squeezed out at the ends of the roller drops back into the drip pan 47 for return to the salvage tank 49 as previously explained.

In this arrangement of the feeding system, the material to be dried is forced through the pipe 44 to the perforated feeder pipe 45 at a rate determined by the operation of the metering pump 41 and at a temperature determined by the operation of the heat exchanger 43. The amount of material fed through the feeder pipe 45 is ordinarily regulated by adjusting the feed pump 41 in such a manner that just sufficient material is provided to maintain the continuous body on the feeder roll with only enough excess to cause a minimum of overflow material to drip back into the feed pan 47.

In a modified feeding arrangement shown in Fig. 6, there is provided a feeder pipe 145 which is fitted with a plurality of short branch pipes 146 extending at right angles from the pipe 145 and lying substantially tangential tangential to the periphery of the feeding roller 28. By this arrangement the wet material flows from the open ends of the branch pipes 146 and merges together in a continuous body or roll which wedges between the surface of the roller 28 and the surface of the belt 17 whereby a film of the required thickness is rolled onto the lower surface of the belt.

Under varying circumstances the branch feeder pipes 146 or the holes 142 in the perforated feeder pipe 45 are spaced closer together or farther apart and are made of different diameters to effect the best distribution of the particular material being dried across the width of the belt depending upon its consistency and various other factors. Under some circumstances the holes 142 may be spaced unequally as shown in the feeder pipe 45 illustrated in Fig. 7. In other instances perhaps a single hole at the midportion of the pipe will suffice or only a few widely spaced holes may be required for the proper application of the material to the surface of the feeding roller 28 while under some circumstances it may be preferable to provide instead of separate holes, a continuous slit in the pipe extending from near one end to near the other end of the feeding roller 28.

Although in the feeding arrangement shown in Fig. 1, the drip pan 47 is of the type which may retain a body of liquid in contact with the lower segment of the feeding roller 28, the feeding apparatus may be arranged to depend solely on feeding through the perforated feeder pipe 45. A feeding apparatus of this nature is shown by way of a modification in Figs. 2 and 3 of the drawing. As there shown, the modified feeder is provided with a relatively deep drip pan 147 that has a relatively wide top encompassing the feeding roller 28 and that tapers down to a semi-cylindrical bottom portion thereby forming a trough of generally V-shape in section. The material to be dried is fed into the V-shaped drip pan 147 through a supply pipe 148 in a manner to maintain a body of the liquid in the lower part of the drip pan as indicated by the liquid level line 149. Excess material that may drip from the feeding roller 28 falls into this body of liquid material and commingles with it. As shown, the material being fed to the feeding roller 28 is withdrawn from the bottom of the drip pan 147 through a pipe 150 that leads to the metering pump 41. From the pump 41 the material is forced through the vertical pipe 42, the heat exchanger 43 and the pipe 44 into the feeder pipe 45.

To maintain the liquid material of uniform consistency, the body of the material in the bottom of the drip pan 147 is continuously stirred by means of a stirring member or agitator 152 that is in the form of a feeding screw or spiral blade 153 carried on a shaft 154 that is journalled at its ends in the opposite ends of the drip trough 147. As shown, the spiral blade 153 of the stirring element is complementary to the semi-cylindrical bottom of the drip pan 147 and operates therein in a manner to both stir the liquid and to urge it toward the outlet pipe 150 to obviate any accumulation of heavier particles of the material in the bottom of the pan. As shown in Fig. 2, one end of the shaft 154 extends through the wall of the drip pan and is provided with a sprocket 155 driven by a chain 156 running over a sprocket 157 mounted on one end of a shaft 158 which projects from and carries the feeding roll 28. Another sprocket 159 on the other end of the feeding roller shaft 158 drives a chain 160 which cooperates with a sprocket 161 for driving the feeding pump 41.

In another modified feeding arrangement that is illustrated in Fig. 8, a perforated feeder pipe 162, generally similar to the feeder pipe 45, is positioned to apply the wet material to the surface of the feeding roller 28 at some distance from the belt 17, the pipe being disposed approximately in the horizontal plane of the axis of the roller. By this arrangement the wet material is applied through spaced openings in the side of the pipe 162 to the surface of the feeding roller in a position at which the surface is moving substantially vertically. Material which drips from the roller 28 to the bottom of the feed pan 47 tends to flow between the roller and the pan bottom but since the clearance space between the pan and the roller is quite small the roller tends to pick up this material and prevent it from flowing under the roller to the drain pipe 48. By this arrangement the feeding roller 28 operates both through receiving the wet material directly from the perforations of the feeder pipe 162 and also by picking up some material from the bottom of the feed pan 47.

In another type of feeder illustrated in Figs. 4 and 5, a feed pipe 163 is disposed longitudinally with its open end generally tangent to the periphery of the feeding roller 28 at a point adjacent to its engagement with the belt 17. In this instance, the open end of the pipe 163 may be flattened in order to form a feed nozzle 164 that may be advanced farther into the V-shaped space between the belt and the roller. If desired, the feed pipe 163 may be oscillated longitudinally of the feed roller to distribute the feeding action along its length or, as a variation, a plurality of the pipes 163 may be arranged in spaced relationship along the feed roller as indicated in Fig. 5.

In accordance with another modification of the feeding system that is shown in Fig. 9 of the drawing, the material to be dried is not rolled directly onto the belt 17 by the feeding roller 28 but is instead scraped from the roller by a doctor blade or spatula 168 which serves to transfer the material to the belt surface by a troweling action whereby a relatively thick layer 169 of the material is laid onto the surface of the belt. As shown, the doctor blade 168 is pivotally mounted on a pivot pin 171 and is preferably provided with a pliable edge 172 that is arranged to engage the periphery of the feed roller 28 regardless of the inclination of the doctor blade 168 about the pivot 171. The other end of the doctor blade 168 adjacent to the belt 17 is supported by a back-up strip 173 that maintains the edge rigidly in position and that is in turn supported by a screw jack adjusting device 174 by means of which the doctor blade 168 may be pivoted about the pin 171 to move its discharge edge closer to or farther from the belt 17 for adjusting the thickness of the layer 169 being applied to the belt surface. Any of the wet material which may fall from the doctor blade 168 or from the belt 17 during the feeding operation is caught by the drip pan 47.

To facilitate the transfer of the material being fed from the feeding roller 28 to the belt 17 and to prevent the material from sticking to and building up on the periphery of the feeding roller it has been found desirable under some circumstances to operate the dehydrator in such a manner that the water vapor in the low pressure atmosphere of the chamber 11 tends to condense upon and form frost on the exposed surface of the feeding roller. This action depends upon the temperature to which the feeding roller is cooled by the coolant circulating through it and the pressure existing within the chamber. The wet material is then applied over the layer of frost and is more readily released for transfer to the belt.

As a further aid in preventing material from adhering to the periphery of the feeding roller 28 there may be provided a scraper or doctor blade 178 of the type shown in Figs. 2 and 3 that is arranged to be applied to the periphery of the feeding roller 28 to scrape from it any material which may adhere to its surface thereby preventing undesirable accumulation on the roller surface that might interfere with the feeding action. As shown, the doctor blade 178 may be arranged to be moved into and out of engagement with the periphery of the feeding roller 28 by means of a supporting and actuating shaft 179 that carries the blade 178. The shaft extends through the wall of the housing 11 and is operated by a manually actuated lever 180 mounted on the end of the shaft exterior of the housing. By this arrangement, the doctor blade 178 may either be maintained continuously in contact with the feeding roller periphery or may be moved into contact with it intermittently as often as necessary through actuation of the control lever 180. The material of the doctor blade 178 may be of any type suitable for use in such service, but it has been found that blades formed of nylon material are satisfactory. Likewise blades formed of laminated phenolic resin material have also been found to be desirable for this service. When the doctor blade 178 is maintained in contact with the feeding roller 28 continuously, excess material remaining on the roller after it has engaged the belt is scraped away and flows over the blade into the drip pan 147 in such a manner that the doctor blade 178 is washed continuously and the surface of the feeding roller is presented in a clean condition for receiving the material being fed to it for transfer to the belt. A doctor blade formed of either nylon or laminated phenolic resin material such as used on the feeding roller 28 may likewise be used as the main doctor blade 31 that serves to remove the dried product from the surface of the belt after it has been cooled by the cooling drum 16.

As a variation of the product removal arrangement, the product receiving trough 32 carrying the screw conveyer 33 may be movably mounted in the housing 11 in such a manner that it may be moved as a unit to the right as shown in Figure 1 from its position beneath the doctor blade 31 whereby material being doctored from the belt 17 may be caused to fall clear of the trough 32 if desired. By this arrangement wet material being scraped from the belt 17 at the beginning of a drying operation may be diverted from the conveyer 33 until the drying action becomes established and the product is dry enough for movement through the conveyer 33 to the product chute 34. This prevents the discharge of improperly dried material into the trough 32 which might otherwise result in clogging the conveyer 33.

From the foregoing description of improved exemplary dehydrating apparatus and the explanation of its mode of operation, it will be apparent that the novel features provided by the present invention are adapted to effect improved operation in accomplishing efficient and economical dehydration of materials from the liquid state. In accordance with the improved methods set forth, heat sensitive materials and the like may be thoroughly dried without subjecting the material to deleterious effects through excessive heating or other injurious action. Furthermore, continuous precise execution of a preferred method of operation is assured through action of the automatic control mechanism embodied in the improved dehydrating apparatus whereby desired optimum operating conditions are maintained regardless of changes in the characteristics of the material being dried or other changes that might otherwise affect the operation of the apparatus.

Although specific examples of particular apparatus illustrative of the present improvements have been set forth herein by way of a full disclosure of useful embodiments of the invention, it is to be understood that other methods of operation and other arrangements of the apparatus including different detailed constructional features may be utilized by those familiar with the art of dehydration without departing from the spirit and scope of the invention as defined by the subjoined claims.

The several features of the invention having now been fully set forth and explained, we claim as our invention:

1. In a dehydrator of the belt and drum type, a rotatably mounted heating drum, a rotatably mounted cooling drum spaced from said heating drum, a material carrying belt arranged to run over said spaced drums for carrying material through a drying cycle, a feeder disposed to apply a film of liquid material for drying to said belt as it recedes from said cooling drum, a pre-evaporator disposed to preheat the segment of said belt between said feeder and said heating drum to pre-evaporate and pre-condition the film of liquid material thereon, a temperature sensing device disposed to sense the temperature of the preheated segment of said belt as it recedes from said pre-evaporator, adjustable control apparatus operatively connected to said temperature sensing device and operative in response thereto to regulate said pre-evaporator, manually operated means arranged to adjust said control apparatus selectively to establish a desired pre-evaporating action, a temperature sensing device disposed to sense the temperature of the segment of said belt heated by said heating drum as it recedes from said drum, adjustable control apparatus operatively connected to said last-mentioned temperature sensing device and operative in response thereto to regulate the temperature of said heating drum, an afterheater disposed to heat the segment of said belt receding from said heating drum to continue the drying of the nearly dry material thereon, a temperature sensing device disposed to sense the temperature of the segment of said belt heated by said afterheater, adjustable control apparatus operatively connected to said last-mentioned temperature sensing device and operative in response thereto to regulate said afterheater, a temperature sensing device disposed to sense the temperature of the segment of said belt cooled by said cooling drum as it recedes from said cooling drum, adjustable control apparatus operatively connected to said last-mentioned temperature sensing device and operative in response thereto to regulate the temperature of said cooling drum, means arranged to selectively adjust said last-mentioned adjustable control apparatus to establish a desired cooling drum temperature to properly cool the dry material and to precondition the belt for receiving liquid material from said feeder, and means operative to remove the cooled dry material from said belt as it runs over said cooling drum, the arrangement being such that the various segments of said drying belt are automatically maintained at predetermined preferred temperatures throughout the drying cycle.

2. In a dehydrator of the drum and belt type for drying wet material containing entrained gases and vapor subject to expansion upon heating, a cooling drum mounted for rotation, a drying belt disposed to run over said cooling drum, a cooling system operatively connected to cool said cooling drum in a manner to maintain the belt segment receding from said cooling drum at a predetermined temperature as it leaves said drum, a conduit arranged to supply the expansible wet material for drying, a heat exchanger arranged to change the temperature of the wet material supplied through said conduit, and a feeding roller disposed to receive wet material supplied through said heat exchanger and said conduit and arranged to roll a film of the wet material onto the outer surface of said belt segment in the run receding from said cooling drum, the arrangement being such that a difference in temperature may be maintained between said belt and the film of wet material by regulating the temperature of said belt segment at the point of application to cause expansion of gases and vapor entrained in the material which is aided by the action of said feeding roller in pulling away from the film as it is applied.

3. In a dehydrator of the belt and drum type for dehydrating wet material containing entrained vapors and gases subject to expansion upon heating, a cooling drum mounted for rotation, a drying belt running over said cooling drum, a feeding roller disposed to roll a film of the expansible wet material onto the outer surface of the belt segment receding from said cooling drum, the action of said feeding roller being such that the material of the film on the belt is pulled away from the belt and expanded as the receding surface of the roller pulls away from the belt, means to change the temperature of the wet material being fed to the belt by said roller, a cooling system arranged to cool said cooling drum, and control apparatus arranged to regulate said cooling system in a manner to maintain said belt segment at a predetermined temperature, whereby the temperature of said belt may be maintained at a level to promote controlled expansion of said material film through the warming effect of said belt upon vapors and gases entrained in said film.

4. In a vacuum dehydrator of the belt and drum type, a housing constituting a vacuum chamber, a heat exchanging drum rotatably mounted within said vacuum chamber, a drying belt arranged to run over said heat exchanging drum to convey material being dried, an evacuator operatively connected to evacuate said vacuum chamber for effecting drying of material on said belt, a distributing nozzle disposed to deliver a stream of heat conducting fluid into the apex of the wedge-shaped space formed between said belt and said drum at the position at which said belt runs onto said drum, and a conduit arranged to admit heat conducting fluid into said nozzle for introduction thereby between said belt and said drum to reestablish the film of heat conducting molecules therebetween for facilitating heat transfer between said drum and said belt to effect the desired heat exchange between said drum and the material being dried on said belt under vacuum.

5. A vacuum apparatus as set forth in claim 4 in which the belt is metallic and in which the distributing nozzle is positioned between said belt and said heat exchanging drum and is directed toward said apex of said wedge-shaped space between said belt and said drum.

6. In apparatus of the drum and belt type, a plurality of rotatably mounted drums, a material carrying belt running over said drums, a feeding roller disposed to roll wet material onto one surface of said belt, a backing roller disposed to engage the other surface of said belt at a position opposite from said feeding roller to support said belt in cooperative relationship with said feeding roller, means to heat the material carried by said belt, and a heat intercepting shield disposed between said heating means and said backing roller in position to shield said backing roller from the heating action of said heating means, whereby said backing roller is protected from heat which might otherwise be transferred through it to said belt and thereby warm said belt above the temperature best adapted to receive the wet material from said feeding roller.

7. A dehydrator as set forth in claim 6, in which the shield substantially encloses said backing roller.

8. In a dehydrator of the belt and drum type, a plurality of spaced drums, a belt trained around and running over said drums, means for heating said belt during a part of its orbit of travel, means for cooling said belt during another portion of its orbit of travel, means for applying a liquid to be dried to the belt intermediate said cooling means and said heating means in the direction of travel of said belt, means for driving the belt in a direction such that each portion thereof passes sequentially said liquid-applying means, said heating means, and said cooling means, means for maintaining the temperature of the liquid to be applied within a predetermined range, temperature-sensing means for sensing the temperature of the belt intermediate said cooling means and said liquid-applying means in the direction of travel of the belt, and means operatively connected to said temperature-sensing means to control the temperature of said cooling means in accordance with the temperature of the belt, whereby a predetermined temperature differential may be maintained between the temperature of a material to be dehydrated and the temperature of the belt at the position of application of the material.

9. The method of facilitating transfer of liquid to the belt of a dehydrator of the belt and drum type including a feeding roller positioned adjacent said belt to apply liquid to be dried to the belt, which comprises cooling the feeding roller to a temperature sufficiently low to cause moisture in the ambient atmosphere to deposit on the said roller as frost which is maintained on the surface of said roller at the point of application of liquid to the belt and thereby facilitating the transfer of liquid material to be dried from the feeding roller to the belt.

10. The method of operating a vacuum dehydrator wherein a belt passes in heat exchange contact with a heat exchanger in an evacuated chamber which comprises transmitting heat between the heat exchanger and the belt to change the heat content of material carried by the belt, the vacuum impairing the heat transferring action between the heat exchanger and the belt, and facilitating the heat transferring action between the belt and the heat exchanger by introducing a heat conducting fluid between the heat exchanger and the belt as the belt passes over the heat exchanger.

11. The method of facilitating heat transfer between a cooling member and a belt of a vacuum dehydrator, said belt carrying material on one face thereof, in which the other face of the belt passes in heat exchange contact with a cooling member and wherein the vacuum impairs the heat transfer action between the belt and said cooling member, which comprises cooling said cooling member to a temperature sufficiently low to cause moisture in the ambient atmosphere to condense on the surface thereof and thereby establish and maintain a film of liquid between said belt and said heat exchanger to increase the rate of heat transfer between the heat exchanger and the belt.

12. The method of drying material from a liquid state on a drying belt running over and in heat exchange contact with a cooling drum in which the material puffs on the belt during the drying operation, that comprises controlling puffing of the material on the belt through continuously controlling the difference in temperature between the belt and the material at the position at which the material is applied to the belt by subjecting liquid to be applied to the belt to heat exchange to maintain the liquid within a predetermined temperature range and by regulating the temperature of the belt at the position at which material is applied thereto by controlling the temperature of the cooling drum.

13. The method of operating a dehydrator of the drum and belt type in which a belt passes over and in heat exchange contact with a cooling drum the temperature of which is adjustably controlled in response to the temperature of a material-receiving belt segment which has passed over the cooling drum, which comprises cooling the material to be dried to a temperature within predetermined limits and lower than the temperature maintained by the cooling drum in the material-receiving segment of the belt, applying the cooled material to the temperature-controlled material-receiving segment of the belt in the form of a thin film which expands through the release of entrained gases as the result of the difference in temperature between the belt and the material, and regulating the characteristics of the expanded film of wet material by controlling the temperature of the cooling drum and thereby controlling the temperature of the material-receiving segment of the belt.

14. The method of dehydrating orange juice or the like in a vacuum dehydrator of the drum and belt type, that comprises subjecting orange juice, concentrated to at least 50% solids, to heat exchange to reduce its temperature to below about 20° F., introducing the juice into a vacuum chamber at an absolute pressure of from about 1 mm. to 2 mm. Hg., applying the juice to a receiving segment of a belt running over drums in the vacuum chamber, one of said drums being cooled to a controlled temperature to cool the belt as it passes over said drum, said controlled temperature being such that the receiving segment of the belt will be maintained at a temperature between 40° and 90° F., preevaporating the juice on the belt to remove about 9% of the moisture and to cause it to puff in a manner to precondition it for drying, subjecting the puffed juice on the belt to the drying heat of a heating drum as the belt runs over the heating drum for a period of time sufficient to remove about 80% of the moisture, then subjecting the nearly dried material to further drying by after-heating it on the belt at a moderate temperature for finally drying the material slowly to remove an additional 6 to 7% of the moisture, and then cooling the belt and the dried material thereon by a cooling drum as the belt runs over the cooling drum to condition it for removal from the belt.

15. The method of facilitating a heat transfer between a heat exchanger and a belt of a vacuum dehydrator of the type having a belt passing in heat exchange contact with a pair of heat exchangers operated respectively at different temperatures and including an applicator positioned in cooperating relationship with the belt along its orbit of travel which applies liquid to be dried to the belt and means for removing dried material from the belt, said dehydrator being operated in a vacuum which impairs the heat transfer action between the belt and the heat exchangers, which method comprises depositing a fluid between one of said heat exchangers and the belt, said fluid conducting heat between the heat exchanger and the belt.

References Cited in the file of this patent

UNITED STATES PATENTS

| | | |
|---|---|---|
| 782,277 | Ruder | Feb. 14, 1905 |
| 785,600 | Ekenberg | Mar. 21, 1905 |
| 1,081,338 | Sleeper | Dec. 16, 1913 |
| 1,146,965 | Sleeper | July 20, 1915 |
| 1,163,439 | Naumann | Dec. 7, 1915 |
| 1,200,117 | Johnson et al. | Oct. 3, 1916 |
| 1,331,389 | Sleeper | Feb. 17, 1920 |
| 1,353,080 | Yahn | Sept. 28, 1920 |
| 1,827,617 | Sasse | Oct. 13, 1931 |
| 2,119,594 | McLean | June 7, 1938 |
| 2,131,666 | McDougall | Sept. 27, 1938 |
| 2,349,300 | Olsen | May 23, 1944 |
| 2,391,195 | Ross | Dec. 18, 1945 |
| 2,728,387 | Smith | Dec. 27, 1955 |

OTHER REFERENCES

Campbell et al.: (Publication), "Research Reports on Quartermaster Contract Projects for the Period From July 1, 1944 through June 30, 1945"; Massachusetts Institute of Technology; received in Library March 6, 1950; pages 176–181 inclusive cited.